United States Patent
Fuhr et al.

[11] Patent Number: 5,852,938
[45] Date of Patent: Dec. 29, 1998

[54] FREEZING APPARATUS FOR LIQUID-FILLED PIPELINES

[75] Inventors: Jürgen Fuhr, Kelkheim; Rudolf Herrgen, Wermelskirchen; Michael Nolle, Kelkheim-Fischbach; Thilo Weber, Karben, all of Germany

[73] Assignee: Rothenberger Werkzeuge AG, Frankfurt am Main, Germany

[21] Appl. No.: 877,594

[22] Filed: Jun. 17, 1997

[30] Foreign Application Priority Data

Jun. 19, 1996 [DE] Germany .................. 196 24 462.5
Mar. 14, 1997 [DE] Germany .................. 197 10 566.1

[51] Int. Cl.$^6$ .................................................. F25D 3/00
[52] U.S. Cl. ........................................ 62/129; 62/293
[58] Field of Search ........................ 62/293, 125, 129

[56] References Cited

U.S. PATENT DOCUMENTS

| | | | |
|---|---|---|---|
| 3,742,723 | 7/1973 | Grise | 62/293 |
| 4,309,875 | 1/1982 | Radichio | 62/293 |
| 4,944,161 | 7/1990 | Van Der Sanden | 62/293 |
| 5,548,965 | 8/1996 | Chen et al. | 62/293 |
| 5,680,770 | 10/1997 | Hall et al. | 62/293 |

*Primary Examiner*—William E. Tapolcai
*Attorney, Agent, or Firm*—Fulbright & Jaworski LLP.

[57] ABSTRACT

A freezing apparatus for liquid-filled pipelines (3, 5) uses a vaporizable refrigerant conducted in a circuit through a hose (13) with an internal capillary line (14). The apparatus has a contact body (1) with a contact surface (2) for the pipeline (3, 5) or for an adapter (4) and expansion chambers (6, 7) for the evaporation of the refrigerant. To improve the ease of handling and the thermal efficiency by making it possible for the temperature to be measured very close to the apparatus, the hose (13) is attached to the contact body (1) in the direction normal to a surface line of the contact surface (13). The contact body (1), furthermore, has a projection (16) at the side of the contact surface (2), this projection carrying a thermally insulated clamping spindle (17) for attaching the contact body (1) to the pipeline (3, 5). The spindle in turn contains a temperature sensor (20, 20a).

12 Claims, 1 Drawing Sheet

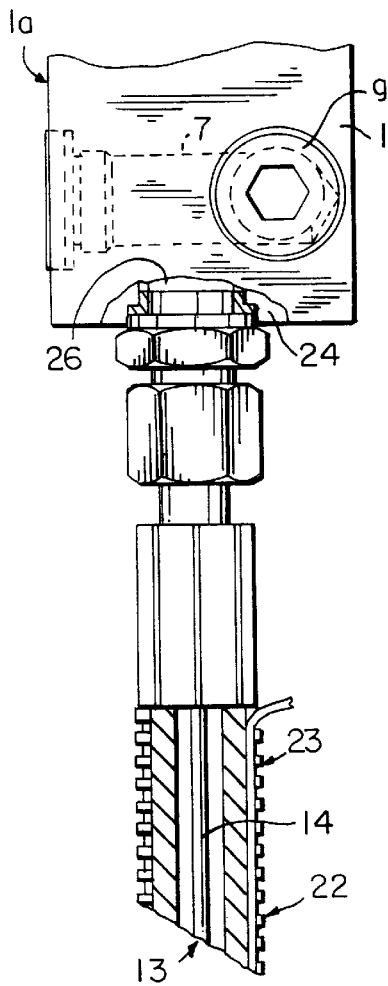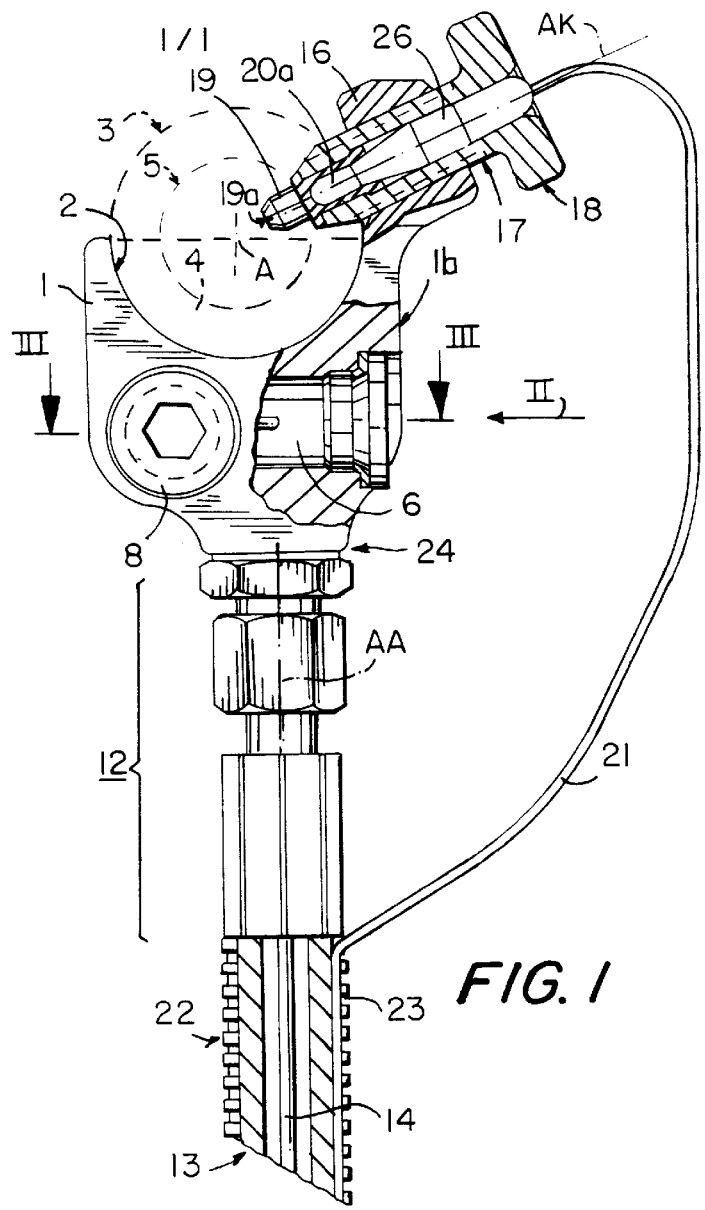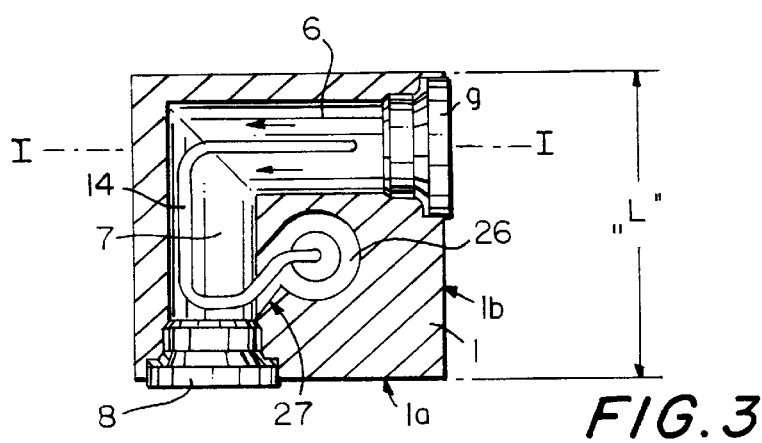

FREEZING APPARATUS FOR LIQUID-FILLED PIPELINES

The invention pertains to an apparatus for freezing liquid-filled pipe lines by means of an vaporizable refrigerant conducted in a circuit. The apparatus is provided with a contact body, which has a partially cylindrical contact surface for the pipeline or for an adapter, and with expansion cam bars for the evaporation of the refrigerant, these chambers being connected fluidically in series. A hose for carrying away the evaporated refrigerant is connected to the contact body, and a capillary line for supplying the liquid refrigerant passes through the hose into the contact body.

A freezing apparatus such as this is known from EP 0 145 114 B1. It has two parallel expansion chambers, which are connected to each other by a transverse bore. Devices of this type are used to make repairs to water-filled heating circuits and are usually provided with a pairwise arrangement of contact bodies so that the section of pipeline between the contact bodies can be blocked off by the formation of ice plugs. Thus a valve or a heating element, for example, can be replaced without the need to drain the entire circuit. The space available for the attachment of the contact body is usually very limited, however, because either the freely exposed section of pipeline is very short and/or the exposed section is located in a corner of the room or in a door or window recess.

Because of the way in which it is produced, the known contact body has three screwed-in sealing plugs and is very large; it also has two approximately semi-cylindrical contact surfaces available for alternative use, either for the pipeline or for an adapter, the axes of which are at right angles to each other, without intersecting. The relatively stiff hose opens coaxially into the end wall of one of the expansion chambers, possibly by way of a rigid connecting elbow. When the one contact surface is placed on a horizontal section of pipe, the hose hangs vertically down from the pipeline, which is favorable in terms of handling. But the axes of the two parallel expansion chambers are perpendicular to the contact surface. The heat is therefore carried away for the most part through the small end surfaces of the expansion chambers, whereas the very much larger cylindrical surfaces are for the most part in heat exchange with the surrounding air, so that the efficiency is impaired.

When the other contact surface is placed on the pipeline, it is true that the cylindrical surfaces, the axes of which are parallel to each other, are for the most part in heat exchange with the pipeline, which is favorable in terms of thermal efficiency, but the stiff hose with its rigid connecting fittings is now parallel to the pipeline. In many cases, however, the apparatus cannot be applied in this way.

The known contact body, furthermore, does not have integrated fastening means by which it can be attached to the pipeline. It would therefore be necessary to use a C-clamp, etc., but clamps of this type are also bulky.

According to the known solution, furthermore, a separate heat sensor must be used to detect if and when the liquid has frozen. A surface temperature of the pipeline of approximately −20° C. is considered a safe identification that the pipeline has been sealed off by ice plugs. But it is precisely in the area of the contact body that a separate temperature sensor cannot be attached or fastened.

The invention is therefore based on the task of improving a freezing apparatus of the general type described above in such a way that the contact body can be attached even to short sections of pipeline without being interfered with by the hose, in any position in a room. The apparatus is also to be designed to offer better thermal efficiency and to allow the temperature to be measured directly at the point where the liquid is to be frozen so as to conserve energy.

The task thus imposed is accomplished according to the invention with a freezing apparatus of the type described above in that:

(a) the hose with the capillary line passing through it is connected at a connecting point to the contact body in the direction normal to a surface line of the contact surface; and in that (b) the contact body, at the side of the contact surface, has a projection, which carries a clamping spindle for fastening the contact body to the pipeline, the spindle carrying in turn a temperature sensor, which can be brought by means of the clamping process into thermal contact with the pipeline on the side of the contact body opposite the connecting point.

A solution of this type is associated with the following advantages:

When the contact body is placed on a pipeline, the hose does not extend parallel to the pipeline, but rather projects perpendicularly away from it; in the case of a horizontal pipeline, the contact body therefore hangs downward from it after it has been attached. This means that the contact body can be attached even to extremely short, freely exposed sections of pipe. Nevertheless, the elongated expansion chambers extend over nearly the entire cross section of the contact body and are the shortest possible distance away from the pipeline to be frozen. The heat from the pipeline can therefore be absorbed over most of the lateral surfaces of the expansion chambers.

Conversely, the uptake of heat from the surrounding air is reduced as a result. Thus the thermal efficiency is increased, and the wage-intensive freezing times are decreased correspondingly. In addition, because of the better heat transfer, a higher-power refrigeration unit can be connected to the contact body, which has the effect of reducing the freezing times even more.

Because of the integration of the temperature sensor into the clamping spindle, the temperature sensor is pressed with great force against the pipeline. The sensor, furthermore, is brought into contact with the pipe in the immediate vicinity of the freezing point, so that it is possible to detect sooner when the section of pipe in question has been sealed off. Thus not only is the reliability greater but also in particular the length of time required to free the pipe is reduced again.

The service person does not need to use an additional C-clamp; on the contrary, the contact body is reliably attached to the pipeline by means of its integrated clamping spindle, which has the effect of increasing the applied force and of ensuring good heat transfer. Overall, both wage and energy costs can be considerably reduced as a result.

The individual effects cooperate with and potentiate each other in a synergistic manner. It is especially advantageous, either alone or in combination, (a) for the adjusting axis of the clamping spindle to be directed at the axis of the contact surface;

(b) for the clamping spindle to be made of a thermally insulating material;

(c) for the clamping spindle to have a thermally conductive, coaxial body in its interior, into which the temperature sensor can be inserted;

(d) for the electrical connecting line of the temperature sensor to pass along the hose;

(e) for the hose to be surrounded in the longitudinal direction by a flexible sheath, which holds the electrical connecting line of the temperature sensor on the hose;

(f) for the flexible sheath to consist of a corrugated hose slotted in the longitudinal direction;

(g) for the flexible sheath to be surrounded at intervals by pretensioned elastomeric rings;

(h) for the contact body, including its projection for the clamping spindle, to consist of an extruded metal profile;

(I) for two expansion chambers to be essentially perpendicular to each other, to open into each other, and to be arranged around a bore, to which the end of the hose is connected by means of a fitting, and for this bore to be connected by means of a slanting bore to one of the expansion chambers, the capillary line passing through this slanting bore; and (j) for the slanting bore to open essentially at a tangent into one of the expansion chambers.

As a result of feature (a), the clamping force and the clamping action become independent of the diameter of the pipeline to be frozen, that is, independent of whether or not the contact body is used with a semi-cylindrical adapter.

Feature (b) makes it possible to achieve a clean thermal separation between the temperature sensor and the thermal influences of the surrounding air and a highly effective thermal separation between the contact body and the temperature sensor.

Feature (c) makes it possible to replace the temperature sensor easily and ensures that the temperatures sensor and the connecting line do not have to be twisted along with the clamping spindle when the spindle is tightened.

Feature (I) makes it possible to achieve a significant increase in the internal surface areas of the expansion chambers which are in heat exchange with the refrigerant and also to reduce the cost of production, in that, namely, only two sealing plugs or screw covers need to be provided to seal off the chambers from the atmosphere.

Feature (j) makes it possible to introduce the slanting bore into the end of one of the expansion chambers, as a result of which a third screw cover is made unnecessary.

An exemplary embodiment of the object of the invention is explained in greater detail below on the basis of FIGS. 1–3:

FIG. 1 shows an end view of the contact body, partially cut away, along line I—I of FIG. 3;

FIG. 2 shows a side view of the object according to FIG. 1 in the direction of arrow II; and FIG. 3 shows a cross section through the contact body along line III—III of FIG. 1.

FIGS. 1, 2, and 3 show a contact body 1, which consists of a sectional view of a light-metal extrusion of length L. Contact body 1 has a sem-cylindrical contact surface 2 with an axis A designed to accept either a pipe 3 of maximum diameter or an adapter 4 for a pipe 5 with a smaller diameter.

In contact body 1, two large-volume expansion chambers 6, 7 are provided a short distance away from contact surface 2; these chambers are designed as cylindrical bores and open into each other. They are sealed off by screw covers 8, 9 on different sides 1a, 1b of contact body 1, which are at right angles to each other. The axes of expansion chambers 6, 7 are at right angles to each other, expansion chamber 7 being parallel to axis A, whereas expansion chamber 6 is perpendicular thereto. There is no connecting channel to be drilled separately and sealed. Expansion chambers 6, 7 are connected fluidically in series.

By means of a fitting 12, a cold-resistant hose 13, which serves to return the evaporated refrigerant and which contains in its interior a capillary line 14 for supplying the liquid refrigerant, is connected to contact body 1. The axis of connecting point 24, which has a bore 26 into which fitting 12 can be screwed, is not all too far from the longitudinal center of contact body 1 and is slightly offset laterally from axis A of contact surface 2. As can be seen, expansion chambers 6, 7 are arranged around bore 26 at a right angle. One end of a slanting bore 27, which does not intersect the thread of screw cover 8, opens at an angle of about 45° into expansion chamber 7, whereas the other end opens tangentially into bore 26.

Capillary line 14 is guided of out hose 13, through slanting bore 27, into expansion chamber 7, and finally up as far as the end of expansion chamber 6, where the cover is. As a result, a return flow of refrigerant develops in expansion chambers 6, 7 and in slanting bore 27, proceeding in the direction of the arrows in the drawing, that is, proceeding from the initially fluid to the purely vaporous state. Heat is thus withdrawn continuously from contact body 1 via the walls of expansion chambers 6, 7 and slanted bore 27, which exerts a certain throttling effect.

At the side of contact surface 2, contact body 1 has a projection 16, formed as a single piece with the contact body. This projection has an internal thread, into which a hollow clamping spindle 17 of plastic with a gripping area 18 and a complementary external thread is inserted. The axis of adjustment AK proceeds in the radial direction with respect to axis A of contact surface 2 in such a way that the direction in which clamping spindle 17 acts is oriented toward contact surface 2.

In actual use, clamping spindle 17 must be screwed farther out of its mating thread than is shown in FIG. 1.

Inside clamping spindle 17 is a metallic, sleeve-like heat conduction body 19, the closed end 19a of which projects out of clamping spindle 17. The tapered end 20a of a temperature sensor 20 is inserted into the other end of the conduction body. Axis AK is situated at the longitudinal center of contact body 1. Any tensile force on hose 13 is therefore absorbed by clamping spindle 17 over the shortest possible path.

Axis AA of fitting 12 and hose 13 is perpendicular to a surface line of contact surface 2. A connecting line 21 proceeds from temperature sensor 20 to hose 13, along which it is guided. For this purpose and to achieve a further improvement in the thermal insulation, hose 13 is surrounded by a flexible sheath 22, which is designed as a corrugated hose, consisting of plastic. The sheath is slotted in the longitudinal direction so that connecting line 21 can be replaced if necessary. Slotted sheath 22 is held together by elastomeric rings 23.

Hose 13 and capillary line 14 are connected at their other ends to a known refrigeration unit, not shown here, which, together with the elements described here, forms the freezing apparatus.

We claim:

1. Apparatus for freezing a liquid-filled pipeline using a vaporizable refrigerant conducted in a circuit, said apparatus comprising: a contact body having a partially cylindrical contact surface (2) adapted to engage with the pipeline (3, 5) and having expansion chambers (6, 7) connected fluidically in series for the evaporation of the refrigerant, a hose (13) for carrying away the evaporated refrigerant being connected to the contact body (1), a capillary line (14) supplying the liquid refrigerant extending through the hose (13) and into the contact body:

(a) the hose (13), with the capillary line (14) passing through it, being connected with a connecting portion (24) of the contact body (1) in a direction normal to a surface line of the contact surface (2); and (b) the contact body (1) having a projection (16) adjacent the contact surface (2), said projection supporting a clamping spindle (17) adapted to attach the contact body (1) to the pipeline (3, 5), the spindle carrying a temperature sensor (20, 20a), which is brought by the clamping process into thermal contact with the pipeline (3, 5) on the side of the contact body (1) distal to the connecting portion (24).

2. Freezing apparatus according to claim 1, wherein the adjustment axis (AK—AK) of the clamping spindle (17) is oriented toward the axis (A) of the contact surface (2).

3. Freezing apparatus according to claim 1, wherein the clamping spindle (17) is formed of a thermally insulating material.

4. Freezing apparatus according to claim 1, wherein the clamping spindle (17) has therein a generally coaxial thermal conduction body (19), supporting therein the temperature sensor (20, 20a).

5. Freezing apparatus according to claim 1, wherein an electrical connecting line (21) connected with the temperature sensor (20, 20a) extends adjacent and along the hose (13).

6. Freezing apparatus according to claim 5, wherein the hose (13) is surrounded in the longitudinal direction by a flexible sheath (22), which holds the electrical connecting line (21) of the temperature sensor (20, 20a) on the hose (13).

7. Freezing apparatus according to claim 6, wherein the flexible sheath (22) comprises a corrugated hose having longitudinal slots therein.

8. Freezing apparatus according to claim 6, wherein the flexible sheath (22) is surrounded at intervals by pretensioned elastomeric rings (23).

9. Freezing apparatus according to claim 1, wherein the contact body (1), including its projection (16) for the clamping spindle (17), consists of an extruded metal profile.

10. Freezing apparatus according to claim 1, wherein said contact body has a bore (26) therein communicating with the hose, said expansion chambers (6, 7) are generally perpendicular to each other, open into each other, and are arranged around said bore (26), to which the end of the hose is connected by means of a fitting (12), said contact body further having a slanting bore (27) connecting the bore (26) to one of the expansion chambers (6, 7), the capillary line (14) passing through the slanting bore (27).

11. Freezing apparatus according to claim 10, wherein the slanting bore opens at an acute angle a tangent into one of the expansion chambers (6, 7).

12. The apparatus according to claim 1, wherein the cylindrical contact surface 2 includes an adaptor 4 providing a fit between the contact body and the pipeline.

* * * * *